United States Patent
Cui et al.

(10) Patent No.: US 10,216,915 B2
(45) Date of Patent: Feb. 26, 2019

(54) AUTHENTICATION METHOD AND APPARATUS THEREOF

(71) Applicant: Tencent Technology (Shenzhen) Company Limited, Shenzhen, Guangdong (CN)

(72) Inventors: Ziyi Cui, Guangdong (CN); Weijie Shen, Guangdong (CN); Yi Luo, Guangdong (CN); Yuhan Huang, Guangdong (CN); Dekang Zeng, Guangdong (CN); Siqi Zhao, Guangdong (CN); Jingyang Qin, Guangdong (CN)

(73) Assignee: TENCENT TECHNOLOGY (SHENZHEN) COMPANY LIMITED, Shenzhen, Guangdong (CN)

(*) Notice: Subject to any disclaimer, the term of this patent is extended or adjusted under 35 U.S.C. 154(b) by 222 days.

(21) Appl. No.: 15/215,299

(22) Filed: Jul. 20, 2016

(65) Prior Publication Data

US 2016/0328549 A1 Nov. 10, 2016

Related U.S. Application Data

(63) Continuation of application No. PCT/CN2015/093066, filed on Oct. 28, 2015.

(30) Foreign Application Priority Data

Nov. 17, 2014 (CN) .......................... 2014 1 0653590

(51) Int. Cl.
*G06F 21/32* (2013.01)
*H04W 12/06* (2009.01)
(Continued)

(52) U.S. Cl.
CPC .............. *G06F 21/32* (2013.01); *G06F 21/35* (2013.01); *H04L 9/3231* (2013.01);
(Continued)

(58) Field of Classification Search
CPC ......... G06F 21/32; G06F 21/35; H04L 9/3231
(Continued)

(56) References Cited

U.S. PATENT DOCUMENTS

2002/0174345 A1 11/2002 Patel
2005/0154920 A1* 7/2005 Tartaglia ............ G07C 9/00158
726/4

(Continued)

FOREIGN PATENT DOCUMENTS

CN 1859095 A 11/2006
CN 101051895 A 10/2007
(Continued)

OTHER PUBLICATIONS

Nguyen, "Draw-A-Pin: Authentication using finger-draw PIN on touch devices", Jan. 27, 2017, Computers & Security, p. 115-128 (Year: 2017).*
(Continued)

*Primary Examiner* — Shawnchoy Rahman
*Assistant Examiner* — Gregory A Lane
(74) *Attorney, Agent, or Firm* — Brinks Gilson & Lione

(57) ABSTRACT

A method and an authentication apparatus are provided by the embodiments of the present disclosure. In the embodiments of the present disclosure, data to be processed is obtained, a character sequence is generated based on the data, physiological feature information sequentially inputted by a user is received to obtain a feature information sequence and it is determined whether every piece of
(Continued)

physiological feature information in the feature information sequence matches with the corresponding character in the character sequence.

20 Claims, 7 Drawing Sheets

(51) Int. Cl.
    *G06F 21/35*     (2013.01)
    *H04L 9/32*     (2006.01)
    *H04L 29/06*     (2006.01)

(52) U.S. Cl.
    CPC ..... *H04W 12/06* (2013.01); *G06F 2221/2103* (2013.01); *H04L 63/0861* (2013.01)

(58) Field of Classification Search
    USPC .......................................................... 726/7
    See application file for complete search history.

(56) References Cited

U.S. PATENT DOCUMENTS

| | | | |
|---|---|---|---|
| 2005/0240779 A1* | 10/2005 | Aull | G06F 21/32 713/186 |
| 2007/0192591 A1 | 8/2007 | Yumoto et al. | |
| 2011/0197270 A1* | 8/2011 | Kaufman | G06F 21/32 726/7 |
| 2011/0231667 A1* | 9/2011 | Kindarji | G06K 9/00885 713/186 |
| 2012/0174214 A1 | 6/2012 | Huang et al. | |

FOREIGN PATENT DOCUMENTS

| | | |
|---|---|---|
| CN | 101174949 A | 5/2008 |
| CN | 102273128 A | 12/2011 |
| CN | 102713887 A | 10/2012 |
| CN | 103077459 A | 5/2013 |
| CN | 103324918 A | 9/2013 |
| CN | 104901805 A | 9/2015 |
| WO | WO2016/078504 A1 | 5/2016 |

OTHER PUBLICATIONS

First Office Action received in Chinese Application No. 201410653590.8 dated Feb. 1, 2016.
Second Office Action received in Chinese Application No. 201410653590.8 dated Apr. 5, 2016.
International Search Report received in PCT Application No. PCT/US2015/093066 dated Feb. 3, 2016.

* cited by examiner

AUTHENTICATION METHOD AND APPARATUS THEREOF

CROSS-REFERENCE TO RELATED APPLICATIONS

This application is a continuation of International Application No. PCT/CN2015/093066, filed on Oct. 28, 2015, which claims priority to Chinese Patent Application No. 201410653590.8 titled "AUTHENTICATION METHOD AND APPARATUS THEREOF" and filed with the State Intellectual Property Office on Nov. 17, 2014, which are incorporated herein by reference in the entireties.

FIELD

The present disclosure relates to the field of communications technology, and in particular to an authentication method and an apparatus thereof.

BACKGROUND

With the development of internet technologies, information security has gained increasing attention. To ensure information security, many authentication solutions have been proposed; fingerprint authentication is one with high security level. In a conventional fingerprint authentication solution, fingerprints inputted by the user are stored in advance as fingerprint sample data; then, in the authentication stage, a fingerprint inputted by the user is obtained, and compared with the fingerprint sample data, if they match, authentication is passed; if they do not match, authentication is not passed.

According to the fingerprint authentication solution above, security cannot be ensured if fingerprint data is stolen or for those identical twins (or multiples) who have identical fingerprints, significantly effecting authentication performance and information security.

SUMMARY

An authentication method and an apparatus thereof are provided according to the embodiments of the present disclosure, which can enhance security, improve authentication performance and ensure information security.

An authentication method is provided according to the present disclosure, which includes:

obtaining, by a processor, data to be processed;

generating, by the processor, a character sequence based on the data;

receiving, by the processor, physiological feature information sequentially inputted by a use, to obtain a feature information sequence; and determining, by the processor, whether every physiological feature information in the feature information sequence matches with the corresponding character in the character sequence.

An authentication apparatus is further provided according to the present disclosure, which includes:

a memory and one or more processors, wherein program instructions are stored in the memory, and the apparatus is configured to perform the following operations when the program instructions are executed by the one or more processors:

obtaining data to be processed;

generating a character sequence based on the data;

receiving physiological feature information sequentially inputted by a user, to obtain a feature information sequence; and determining whether every physiological feature information in the feature information sequence matches with the corresponding character in the character sequence.

In the embodiments according to the present disclosure, the data to be processed is obtained, the character sequence is generated based on the data, the physiological feature information sequentially inputted by a user is received to obtain the feature information sequence and it is determined whether every physiological feature information in the feature information sequence matches with the corresponding character in the character sequence, authentication is passed when every physiological feature information in the feature information sequence matches with the corresponding character in the character sequence; and authentication is not passed when not every physiological feature information in the feature information sequence matches with the corresponding character in the character sequence. In this solution, authentication is not based on a single piece of information, for example, one fingerprint, but a correspondence between a plurality of physiological feature information and multiple characters; and since there are many possible combinations of the plurality of physiological feature information and the multiple characters, there may also be various correspondences therebetween. Thus, even if a certain physiological feature information is stolen, the correspondence cannot be easily cracked, thereby enhancing security, improving authentication performance and ensuring information security.

BRIEF DESCRIPTION OF THE DRAWINGS

For a better understanding of the technical solutions of the embodiments of the present disclosure, drawings used in the description of the embodiments are described briefly as follows. Clearly, the drawings described herein illustrate only some embodiments of the invention. For those skilled in the art, other drawings may be obtained based on these drawings without inventive effort.

DETAILED DESCRIPTION

Technical solutions according to the embodiments of the present disclosure will be described hereinafter in conjunction with the accompanying drawings. Clearly, the embodiments herein are only some embodiments of the invention. Any other embodiments obtained by those skilled in the art based on the embodiments in the present disclosure without inventive effort shall fall in the scope of the invention.

A method, an apparatus and a system for authentication are provided according to the embodiments of the present disclosure, which are described hereinafter in detail.

Embodiment 1

The embodiment provides an authentication method, which can be performed by an authentication apparatus such as a terminal or a server, where the terminal may be a device such as cellphone, tablet computer or personal computer (PC).

The authentication method according to the embodiment includes: obtaining data to be processed; generating a character sequence based on the data; receiving physiological feature information sequentially inputted by a user, to obtain a feature information sequence; and determining whether every physiological feature information in the feature information sequence matches with the corresponding character in the character sequence, if so, authentication is passed; if not, authentication is not passed.

Figure 1:
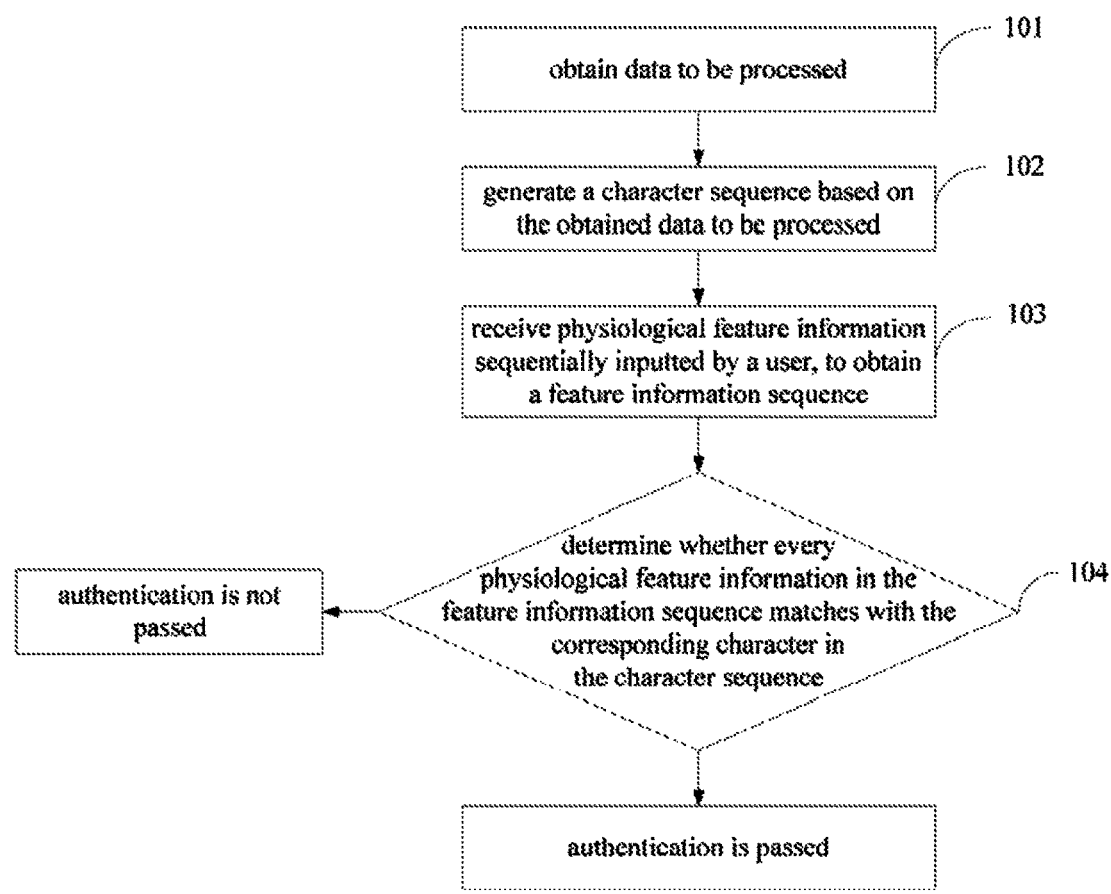
FIG. 1 is a flowchart of an authentication method according to an embodiment of the present disclosure.

As shown in FIG. 1, the authentication method may include steps 101 to 104.

Step 101 includes: obtaining data to be processed.

For example, when the authentication apparatus is a terminal, the terminal may receive a message such as data processing request or authentication request inputted by a user, and obtain the data to be processed based on the message such as data processing request or authentication request.

For another example, when the authentication apparatus is a server, the server may receive a message such as data processing request or authentication request sent by a terminal, and obtain the data to be processed based on the message such as data processing request or authentication request.

The data to be processed may take various forms, such as a value to be transferred.

Step 102 includes: generating a character sequence based on the obtained data to be processed.

Various types of characters may be used according to actual needs, for example, digits such as 0 to 9, English letters, Greek letters or other symbols, the details of which are omitted.

For example, the data to be processed may be a value to be transferred. In the case where the amount of money to be transferred is 25 Yuan and 5 Jiao, the amount of money to be transferred may be converted into a corresponding character sequence (which may include digits and the decimal point), for example, a character sequence "25.5".

It should be noted that for illustrative purposes, digits 0 to 9 and the decimal point "." will be used as examples in the embodiments of the present disclosure. It should be understood that other characters may be used in a similar way, the details of which are omitted.

Step 103 includes: receiving physiological feature information sequentially inputted by a user, to obtain a feature information sequence.

For example, physiological feature information sequentially inputted by a user according to the order of the characters in the character sequence may be received directly without displaying the character sequence. For example, an authentication policy may be agreed upon with the user while he/she is customizing the function, in which case the user is prompted directly for the physiological feature information without displaying the character sequence, then the user may estimate the order of the characters in the character sequence according to the agreed authentication policy and input the corresponding physiological feature information.

As a matter of course, in order to facilitate user operations, the character sequence may be displayed and the user may be prompted, so that the user operates as prompted, that is, the step of "receiving physiological feature information sequentially inputted by a user, to obtain a feature information sequence" (step 103) may include:

displaying the character sequence, prompting the user, and receiving physiological feature information sequentially inputted by a user according to the order of the characters in the character sequence as instructed by the prompt, to obtain a feature information sequence.

Still taking transferring 25 Yuan and 5 Jiao as an example, the generated character sequence "25.5" may be displayed, and the user may be prompted to sequentially input physiological feature information corresponding to respective characters in "25.5"; then, physiological feature information corresponding to character "2", physiological feature information corresponding to character "5", physiological feature information corresponding to character "." and physiological feature information corresponding to character "5", which are sequentially inputted by the user as prompted, are received, and the received physiological feature information corresponding to the 4 characters forms a feature information sequence.

The physiological feature information may include fingerprint, iris, voiceprint and/or palmprint information.

It should be noted that when the authentication apparatus is a terminal, the terminal may directly display the character sequence and prompt the user when the authentication apparatus is a server, the server may send the character sequence to a terminal for display, prompt the user via the terminal, and receive feature information sequence sent by the terminal, the details of which are omitted.

Step 104 includes: determining whether every physiological feature information in the feature information sequence matches with the corresponding character in the character sequence, if so, authentication is passed, and the data to be processed can be processed; if not, authentication is not passed.

According to an embodiment of the invention, the determining whether every physiological feature information in the feature information sequence matches with the corresponding character in the character sequence may include: according to the order of appearance of the physiological feature information in the feature information sequence and the order of appearance of the characters in the character sequence, determining whether every pair of physiological feature information and character that are in the same order match. The correspondence between characters and physiological feature information may be stored in a physiological feature information database. For example, in the case where the characters include digits 0 to 9 and the decimal point ".", the physiological feature information database may store a correspondence between digits 0 to 9 and the decimal point "." and respective

TABLE 1

| Characters | Physiological feature information |
|---|---|
| 0 | Physiological feature information 1 |
| 1 | Physiological feature information 2 |
| 2 | Physiological feature information 3 |
| 3 | Physiological feature information 4 |
| 4 | Physiological feature information 5 |
| 5 | Physiological feature information 5 |
| 6 | Physiological feature information 7 |
| 7 | Physiological feature information 8 |
| 8 | Physiological feature information 9 |
| 9 | Physiological feature information 10 |
| . (decimal point) | Physiological feature information 11 |
| ... | ... |

For example, when the character sequence is "25.5" and the correspondence between the characters and the physiological feature information is as shown in Table 1, if the physiological feature information in the received feature information sequence is "Physiological feature information 3→Physiological feature information 6→Physiological feature information 11→Physiological feature information 6", it is indicated that every physiological feature information in the feature information sequence matches with the corresponding character in the character sequence, and it is determined that authentication is passed; otherwise, if the physiological feature information in the received feature information sequence is not "Physiological feature information 3→Physiological feature information 6→Physiological feature information 11→Physiological feature information 6", it is indicated that not every physiological feature information in the feature information sequence matches with the corresponding character in the character sequence, and it is determined that authentication is not passed. Details are omitted.

Physiological feature information corresponding to different characters may be the same or different. The correspondence between the characters and physiological feature information may be set according to actual needs, preset by a system or set by the user, that is, prior to the step of obtaining data to be processed (step 101), the authentication method may further include:

building a physiological feature information database, where the physiological feature information database is configured to store a correspondence between characters and physiological feature information, which, for example, may be implemented through one of the following methods.

(1) A First Method Includes Steps S11 to S14.

Step S11 includes: obtaining a plurality of physiological feature information of the user.

For example, when the authentication apparatus is a terminal, the terminal may receive a plurality of physiological feature information inputted by the user; and when the authentication apparatus is a server, the server may receive a plurality of physiological feature information of the user sent by a terminal.

Step S12 includes: receiving a correspondence establishing request of the user, where the correspondence establishing request instructs a correspondence between characters and the physiological feature information.

For example, when the authentication apparatus is a terminal, the terminal may receive a correspondence establishing request from the user; and when the authentication apparatus is a server, the authentication apparatus may receive a correspondence establishing request from the user sent by a terminal.

Step S13 includes: establishing a correspondence between the plurality of physiological feature information and characters according to the correspondence establishing request.

Step S14 includes: storing the correspondence in a physiological feature information database.

The physiological feature information database may be stored in the authentication apparatus, or in some other device, the details of which are omitted.

For example, the prints of ten fingers inputted by the user may be received and stored; upon receipt of a correspondence establishing request from the user, corresponding fingerprints may be assigned to characters according to the instruction of the correspondence establishing request, establishing a correspondence between the characters and the stored fingerprints. For example, a correspondence is established between character "1" and a thumbprint, a correspondence is established between character "2" and an index finger print, a correspondence is established between character "3" and a thumbprint as well, and so on. Then these correspondences are stored in the physiological feature information database.

It should be noted that the plurality of physiological feature information received, such as the prints of the ten fingers, serve as a resource; all or only some of the prints may be used in establishing the correspondences with the characters, the details of which are omitted.

(2) A Second Method Includes Step S21 to S23.

Step 21 includes: displaying characters and receiving physiological feature information sequentially inputted by a user according to the order of the characters.

For example, when the authentication apparatus is a terminal, the terminal may display the characters and receive the physiological feature information inputted by the user for the displayed characters; and when the authentication apparatus is a server, the server may receive the physiological feature information inputted by the user for the displayed characters, which is sent by a terminal.

Step S22 includes: establishing a correspondence between the displayed characters and the physiological feature information inputted by the user for the displayed characters.

Step S23 includes: storing the correspondence in a physiological feature information database.

For example, when digits 0 to 9 and the decimal point "." are used as the characters, digits 0 to 9 and the decimal point "." may be displayed, respectively; the user may be prompted to input physiological feature information for the displayed characters, for example, fingerprints; and a correspondence between the displayed characters and the physiological feature information inputted by the user for the displayed characters may be established according to the physiological feature information inputted by the user, for example, the fingerprints; and the correspondence may be stored in the physiological feature information database.

It should be noted that the characters such as digits 0 to 9 and the decimal point "." may be displayed one after another, or in groups, or even all at the same time, the details of which are omitted.

Optionally, in order to enhance security, prior to the determining whether every physiological feature information in the feature information sequence matches with the corresponding character in the character sequence, a preliminary authentication may be performed on the identity of the user, that is, prior to the step of determining whether every physiological feature information in the feature information sequence matches with the corresponding character in the character sequence, the authentication method may further include:

obtaining a user identifier of the user and determining whether the obtained user identifier matches with a preset user identifier.

If it is determined that the obtained user identifier does not match with the preset user identifier, subsequent operations are denied, for example, rejecting user's data processing requests, authentication requests, etc.

The user identifier may include at least one of: user's e-mail account, username and nickname.

Various verification methods can be used in determining whether the obtained user identifier matches with the preset user identifier, such as password verification, random code verification and any other verification method, the details of which are omitted.

In addition, in order to avoid authentication failures caused by mistakes of the user and to enhance security, optionally, multiple opportunities may be provided for the user to re-input physiological feature information, that is, if it is determined that not every physiological feature information in the feature information sequence matches with the corresponding character in the character sequence, the method may further include:

determining whether the number of authentication failures exceeds a predetermined threshold, if not, returning to the step of receiving physiological feature information sequentially inputted by a user; if so, canceling processing of the data.

The predetermined threshold may be set according to actual needs, for example, to be 3 or 5.

As described above, in this embodiment, data to be processed is obtained; a character sequence is generated based on the data; physiological feature information sequentially inputted by a user is received to obtain a feature information sequence; and it is determined whether every physiological feature information in the feature information sequence matches with the corresponding character in the character sequence, if so, authentication is passed, and the data to be processed can be processed; if not, authentication is not passed. In this solution, authentication is not based on a single piece of information, for example, one fingerprint, but a correspondence between a plurality of physiological feature information and multiple characters; and since there are many possible combinations of the plurality of physiological feature information and the multiple characters, there may also be various correspondences therebetween. Thus, even if a certain physiological feature information is stolen, the correspondence cannot be easily cracked, thereby enhancing security, improving authentication performance and ensuring information security.

Embodiments 2 and 3 will be described in detail below with reference to the embodiment 1.

Embodiment 2

In the embodiment, the authentication apparatus is a server, as an example.

Figure 2A:
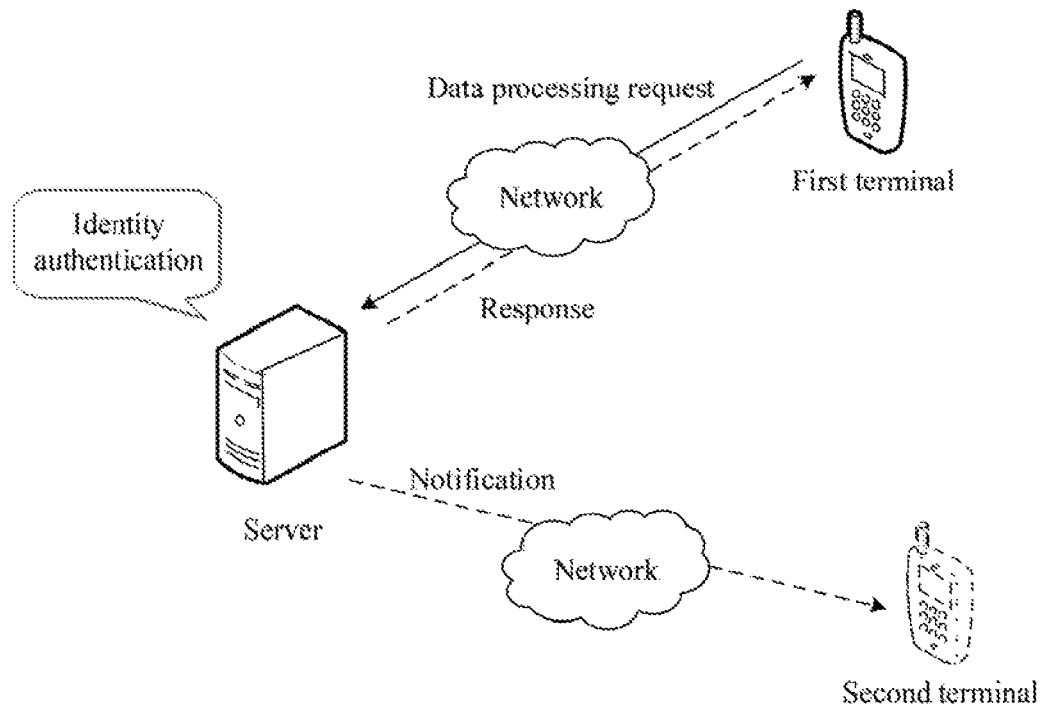
FIG. 2a is a schematic diagram of a scenario where an authentication method according to an embodiment of the present disclosure is applied.

As shown in FIG. 2a, a communications system to which the authentication method is applied may include a server and a first terminal; additionally, the communication system may further include some other devices, for example, a second terminal related to data processing such as payment or account transfer, and respective functions of the devices are described as follows.

(1) First Terminal

The first terminal is configured to send a message such as data processing request or authentication request to the server, display a character sequence upon receipt of the character sequence sent by the server, receive physiological feature information sequentially inputted by a user according to the order of the characters in the character sequence, to obtain a feature information sequence, and send the feature information sequence to the server.

(2) Server

The server is configured to receive the message such as data processing request or authentication request sent by the first terminal, obtain data to be processed based on the message such as data processing request or authentication request, generate the character sequence based on the data, send the character sequence to the first terminal, receive the feature information sequence returned by the first terminal based on the character sequence, determine whether every physiological feature information in the feature information sequence matches with the corresponding character in the character sequence based on a preset physiological feature information database, if so, authentication is passed, and process the data to be processed when needed, e.g., payment or account transfer, if not, authentication is not passed, reject the data processing request or return an authentication failure prompt.

In addition, the server may be further configured to send a response to the data processing request to the first terminal, and if the processing of the data involves other devices, for example, the second terminal, the server may be further configured to send a notification on the processing result of the data to the second terminal, for example, a notification on the result of transfer or payment, the details of which are omitted.

Figure 2B:
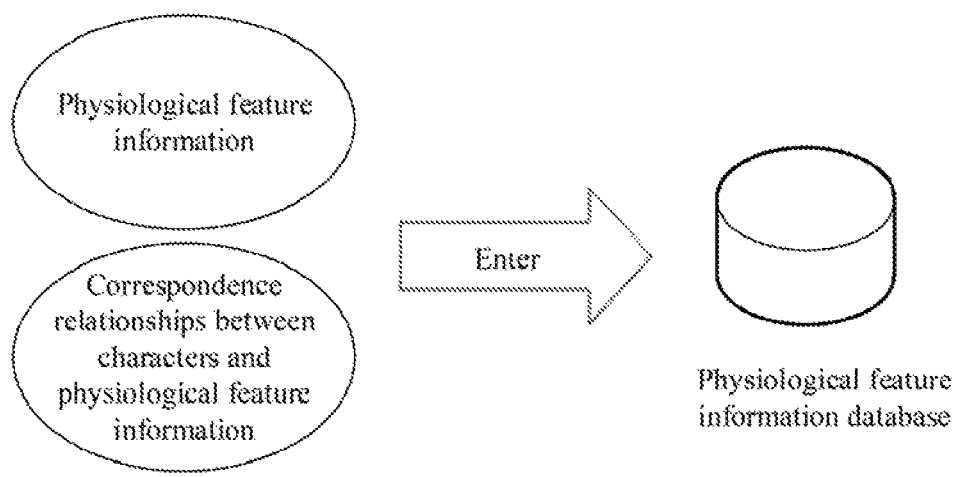
FIG. 2b is a schematic diagram of a scenario where physiological feature information is entered according to an embodiment of the present disclosure.

The physiological feature information database may be stored in the server or in some other device, and is mainly configured to store a correspondence between characters and physiological feature information, which may be entered by the user in advance through the first terminal, as is shown in FIG. 2b, as an example. For building the physiological feature information database, please refer to the first embodiment, the details of which are omitted.

(3) Second Terminal

The second terminal is configured to receive the notification on the processing result of the data.

Based on the structure of the communications system, the authentication method is described in detail hereinafter. For ease of description, the authentication method is described with an example where the processing of the data is account transfer, and hence, the data processing request is a transfer request.

Figure 2C:
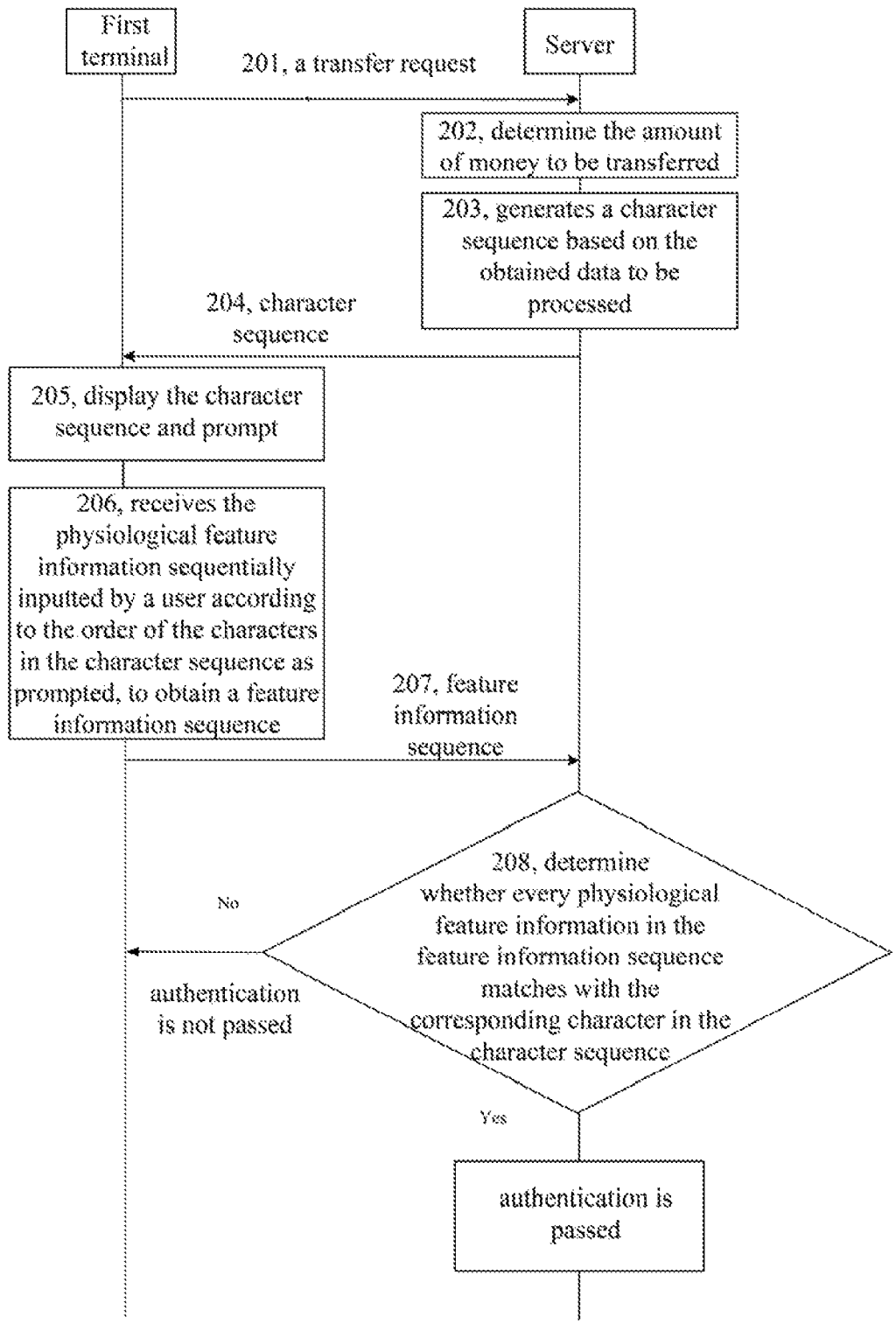
FIG. 2c is a flowchart of an authentication method according to an embodiment of the present disclosure.

As shown in FIG. 2c, the method may include the following steps 201 to 208.

In step 201, the first terminal sends a transfer request to the server, for example, an instruction of transferring a certain amount of money to an account of the second terminal, where the transfer request carries a user identifier of the first terminal, and may further carry a user identifier of the second terminal.

The user identifier may include at least one of: user's e-mail account, username and nickname.

In step 202, upon receipt of the transfer request, the server obtains data to be processed according to the transfer request, for example, determines the amount of money to be transferred.

In step 203, the server generates a character sequence based on the obtained data to be processed, for example, a corresponding character sequence based on the amount of the money to be transferred.

For example, when the characters include digits to 9 and the decimal point "." and the amount of the money to be transferred is 25 Yuan and 5 Jiao, a character sequence "25.5" may be generated correspondingly.

Figure 2D:
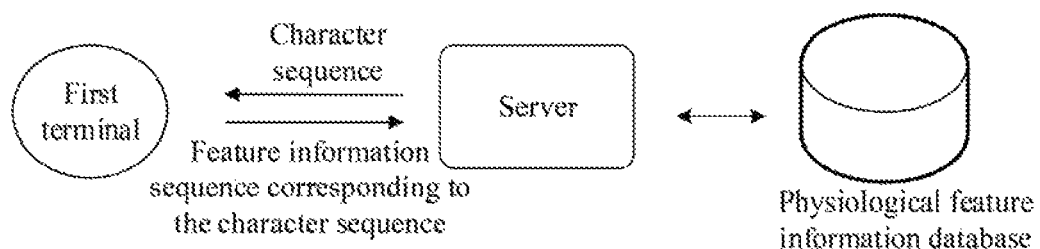
FIG. 2d is a schematic diagram of a process of authentication according to an embodiment of the present disclosure.

In step 204, the server sends the generated character sequence, for example, "25.5", to the first terminal, as is shown in FIG. 2d.

In step 205, upon receipt of the character sequence, for example, "25.5", the first terminal displays the character sequence and prompts the user to sequentially input corresponding physiological feature information based on the character sequence.

For example, in the case of transferring 25 Yuan and 5 Jiao, the generated character sequence "25.5" may be displayed and the user may be prompted to sequentially input physiological feature information corresponding to the characters in "25.5", such as fingerprint, iris, voiceprint and/or palmprint information.

In step 206, the first terminal receives the physiological feature information sequentially inputted by a user according to the order of the characters in the character sequence as prompted, such as fingerprint, iris, voiceprint and/or palmprint information, to obtain a feature information sequence.

For example, still taking transferring 25 Yuan and 5 Jiao as an example, physiological feature information corresponding to character "2", physiological feature information corresponding to character "5", physiological feature information corresponding to character ".", and physiological feature information corresponding to character "5", which are sequentially inputted by the user as prompted, are received, and the received physiological feature information corresponding to the 4 characters forms a feature information sequence.

In step 207, the first terminal sends the obtained feature information sequence to the server, as is shown in FIG. 2d.

In step 208, upon receipt of the feature information sequence, the server determines whether every physiological feature information in the feature information sequence matches with the corresponding character in the character sequence, if so, determines authentication is passed; if not, determines authentication is not passed and rejects the transfer request.

A physiological feature information database may be used to store a correspondence between characters and physiological feature information. For example, when the characters include digits 0 to 9 and the decimal point ".", and the physiological feature information is fingerprints, the correspondence between digits 0 to 9 and the decimal point "." and fingerprints may be stored in the physiological feature information database. For building a physiological feature information database, please refer to the previous embodiments, the details of which are omitted.

Optionally, in order to enhance security, prior to the determining whether every physiological feature information in the feature information sequence matches with the corresponding character in the character sequence, a preliminary authentication may be performed on the identity of the user, for example, it may be determined that whether a user identifier of the first terminal carried in the transfer request matches with a preset user identifier, and the step of "determining whether every physiological feature information in the feature information sequence matches with the corresponding character in the character sequence" is performed only if the user identifier of the first terminal carried in the transfer request matches with the preset user identifier, otherwise, the transfer request is directly rejected and the step of determining whether every physiological feature information in the feature information sequence matches with the corresponding character in the character sequence is not performed.

It should be noted that alternatively the step of preliminary authentication on the identity of the user may be performed on receiving the transfer request of the user, that is, after step 201. If it is determined that the user identifier matches with the preset user identifier, step 202 is performed; if it is determined that the user identifier does not match with the preset user identifier, the transfer request is directly rejected, the details of which are omitted.

It should be further noted that in this embodiment the transfer request is used as merely an example, and it should be understood that the method also applies to any other data processing, with a similar execution flow, the details of which are omitted.

Thereafter, the server may notify a relevant terminal of a processing result of the data, for example, an account transfer result, for example, the server may notify the second terminal of an account transfer result according to the user identifier of the second terminal.

As described above, in the embodiment, the server determines the amount of the money to be transferred based on the transfer request sent by the first terminal, generates the character sequence based on the amount, sends the character sequence to the first terminal to prompt the user to sequentially input corresponding physiological feature information (i.e., feature information sequence), for example, fingerprints, according to the order of the characters in the character sequence, receives the feature information sequence returned by the first terminal, determines whether every physiological feature information in the feature information sequence matches with the corresponding character in the character sequence based on the preset physiological feature information database (the physiological feature information database is configured to store a correspondence between characters and physiological feature information), if so, determines authentication is passed; if not, determines authentication is not passed. In the solution, authentication is not based on a single piece of information, for example, one fingerprint, but a correspondence between a plurality of physiological feature information and multiple characters; and since there are many possible combinations of the plurality of physiological feature information and the multiple characters, there may also be various correspondences therebetween. Thus, even if a certain physiological feature information is stolen, the correspondence cannot be easily cracked, thereby enhancing security, improving authentication performance and ensuring information security.

Embodiment 3

In the embodiment, the authentication apparatus is a terminal, as an example.

Figure 3A:
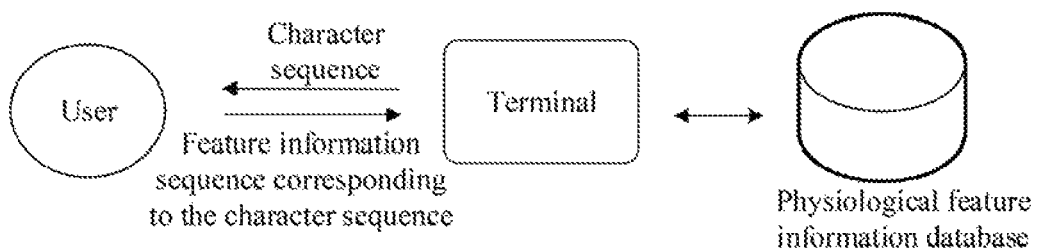
FIG. 3a is a schematic diagram of another process of an authentication method according to an embodiment of the present disclosure.

As shown in FIG. 3a, a communications system to which the authentication method is applied may include a terminal and a physiological feature information database.

The terminal is configured to receive a message such as data processing request or authentication request inputted by a user, obtain data to be processed based on the message such as data processing request or authentication request, generate a character sequence based on the data, display the character sequence, receive physiological feature information sequentially inputted by a user according to the order of characters in the character sequence to obtain a feature information sequence, determine whether every physiological feature information in the feature information sequence matches with the corresponding character in the character sequence based on the physiological feature information database, if so, determine authentication is passed, and perform subsequent data processing, for example, file processing, and optionally, return a notification indicating authentication is passed to a first terminal; if not every physiological feature information in the feature information sequence matches with the corresponding character in the character sequence, determine authentication is not passed, reject the data processing request or return a prompt indicating authentication failure to the first terminal.

The physiological feature information database may be stored in the terminal or in some other device, for example, in cloud storage. The physiological feature information database is mainly configured to store a correspondence between characters and physiological feature information, which may be entered by the user in advance through the first terminal, as is shown in FIG. 2b, as an example. For building the physiological feature information database, please refer to the first embodiment, the details of which are omitted.

Based on the structure of the communications system, the authentication method is described in detail hereinafter. For ease of description, the authentication method is described with an example where the processing of the data is starting a terminal application in the terminal, and the data processing request is a request for starting a terminal application.

Figure 3B:
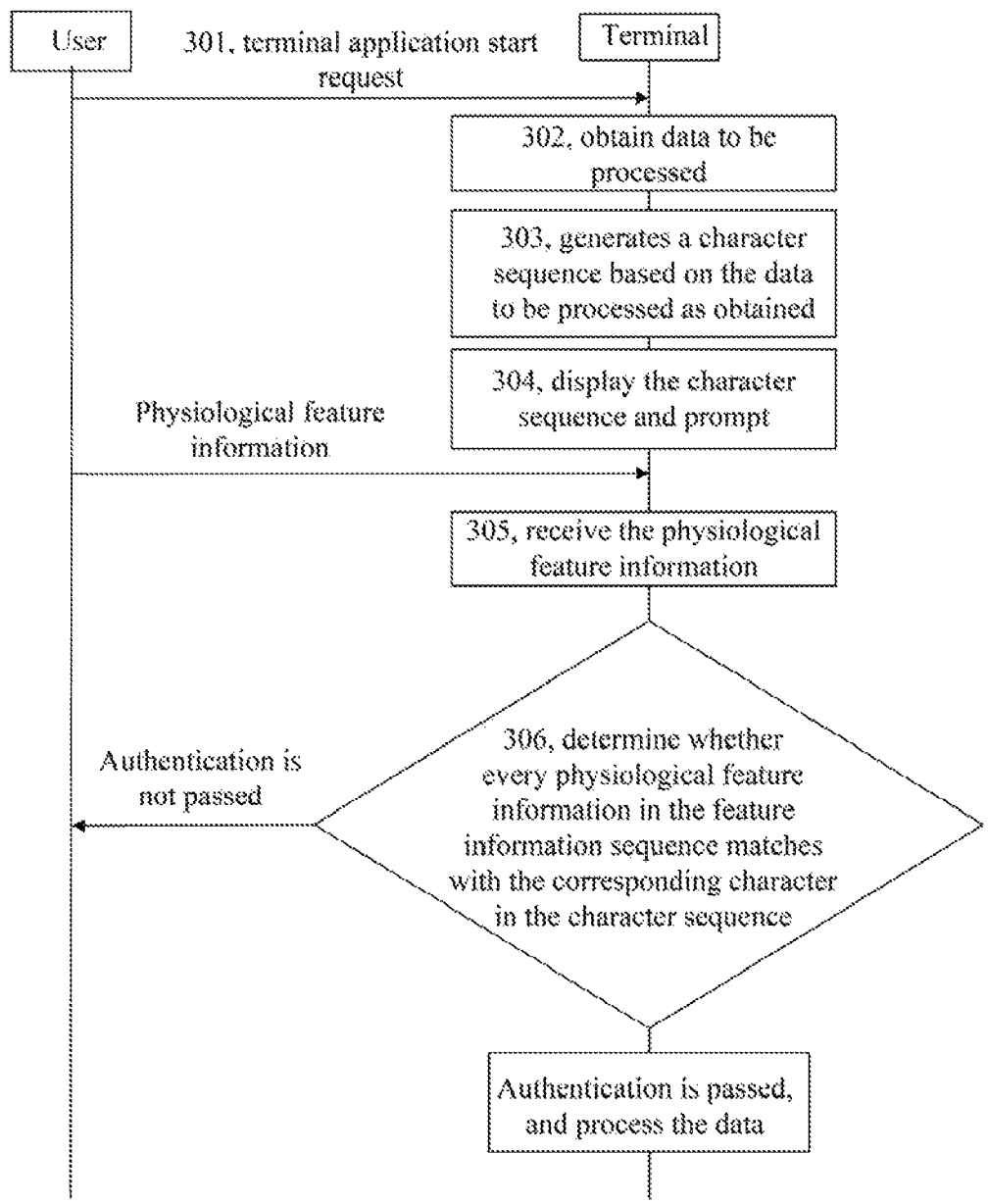
FIG. 3b is a flowchart of an authentication method according to an embodiment of the present disclosure.

As shown in FIG. 3b, the method may include steps 301 to 306.

In step 301, the terminal receives a terminal application start request triggered by the user.

In step 302, the terminal obtains data to be processed based on the terminal application start request upon receipt the terminal application start request, for example, determines a terminal application to be started, for example, photos.

In step 303, the terminal generates a character sequence based on the data to be processed as obtained.

For example, corresponding character sequences may be set for different terminal applications, alternatively, random character sequences may be generated for different terminal applications. For example, when the terminal application is photos, a character sequence "1234" may be generated, and so on. Specific policy may be set according to actual requirements of the applications.

In step 304, the terminal displays the character sequence and prompts the user to sequentially input corresponding physiological feature information based on the character sequence.

For example, the terminal may display "1234", and prompt the user to sequentially input respective physiological feature information corresponding to the characters in "1234", such as fingerprint, iris, voiceprint and/or palmprint information.

In step 305, the terminal receives the physiological feature information sequentially inputted by a user according to the order of the characters in the character sequence as prompted, such as fingerprint, iris, voiceprint and/or palmprint information, to obtain a feature information sequence.

For example, when the character sequence is "1234", physiological feature information corresponding to character "1", physiological feature information corresponding to character "2", physiological feature information corresponding to character "3" and physiological feature information corresponding to character "4", which are sequentially inputted by the user as prompted, are received, and the received physiological feature information corresponding to the 4 characters forms a feature information sequence.

In step 306, the terminal determines whether every physiological feature information in the feature information sequence matches with the corresponding character in the character sequence, if so, determines authentication is passed, and processes the data to be processed, for example, start the terminal application, for example, photos, or send user a notification indicating that the authentication is passed; if not, determines authentication is not passed and rejects starting the terminal application, and optionally, send user a notification indicating the authentication is not passed.

A physiological feature information database may be used to store a correspondence between characters and physiological feature information. For example, when the characters include digits 0 to 9 and the decimal point ".", and the physiological feature information is fingerprints, the correspondence between digits 0 to 9 and the decimal point "." and fingerprints may be stored in the physiological feature information database. For building a physiological feature information database, please refer to the previous embodiments, the details of which are omitted.

It should be further noted that in this embodiment the terminal application start request is used as merely an example, and it should be understood that the method also applies to any other data processing, with a similar execution flow, the details of which are omitted.

As described above, in the embodiment, the terminal obtains the data to be processed from the terminal application start request triggered by the user, generates the corresponding character sequence based on the data to be processed, displays the character sequence, prompts the user to sequentially input corresponding physiological feature information, for example, fingerprints, according to the order of the characters in the character sequence to obtain the feature information sequence. Then the terminal determines whether every physiological feature information in the feature information sequence matches with the corresponding character in the character sequence based on the preset physiological feature information database (the physiological feature information database is configured to store a correspondence between characters and physiological feature information), if so, determines authentication is passed; if not, determines authentication is not passed. In this solution, authentication is not based on a single piece of information, for example, one fingerprint, but a correspondence between a plurality of physiological feature information and multiple characters; and since there are many possible combinations of the plurality of physiological feature information and the multiple characters, there may also be various correspondences therebetween. Thus, even if a certain physiological feature information is stolen, the correspondence cannot be easily cracked, thereby enhancing security, improving authentication performance and ensuring information security.

Embodiment 4

For a better implementation of the method above, accordingly, an authentication apparatus is provided according to an embodiment of the present disclosure. As shown in FIG.

4*a*, the authentication apparatus includes an obtaining unit 401, a generating unit 402, a receiving unit 403 and an authenticating unit 404.

The obtaining unit 401 is configured to obtain data to be processed.

For example, when the authentication apparatus is a terminal, the obtaining unit 401 may be configured to receive a message such as data processing request or authentication request inputted by a user, and obtain the data to be obtained based on the message such as data processing request or authentication request.

For another example, when the authentication apparatus is a server, the obtaining unit 401 may be configured to receive a message such as data processing request or authentication request sent by a terminal and obtain the data to be obtained based on the message such as the data processing request or the authentication request.

The data to be processed may take various forms, such as a value to be transferred.

Various types of characters may be used according to actual needs, for example, digits such as 0 to 9, English letters, Greek letters or other symbols, the details of which are omitted.

For example, the data to be processed obtained by the obtaining unit 401 may be a value to be transferred. For example, in the case where the request is for account transfer and amount of money to be transferred is 25 Yuan and 5 Jiao, the amount of money to be transferred may be converted into a corresponding character sequence (which may include digits and the decimal point), for example, a character sequence "25.5".

The receiving unit 403 is configured to receive physiological feature information sequentially inputted by a user, to obtain a feature information sequence.

For example, physiological feature information sequentially inputted by a user according to the order of the characters in the character sequence may be received directly, without displaying the character sequence. For example, an authentication policy may be agreed upon with the user while he/she is customizing the function, in which case the user is prompted directly for the physiological feature information without displaying the character sequence, then the user may estimate the order of the characters in the character sequence according to the agreed authentication policy and input the corresponding physiological feature information.

As a matter of course, in order to facilitate user operations, the character sequence may be displayed and the user may be prompted, so that the user operates as prompted, that is.

The receiving unit 403 is specifically configured to display the character sequence, prompt the user, and receive physiological feature information sequentially inputted by a user according to the order of the characters in the character sequence as instructed by the prompt, to obtain a feature information sequence.

The physiological feature information may include fingerprint, iris, voiceprint and/or palmprint information.

It should be noted that when the authentication apparatus is a terminal, the receiving unit 403 may directly display the character sequence and prompt the user, and when the authentication apparatus is a server, the server may send the character sequence to a terminal for display, prompt the user via the terminal, and receive feature information sequence sent by the terminal via the receiving unit 403, the details of which are omitted.

The authenticating unit 404 is configured to determine every physiological feature information in the feature information sequence matches with the corresponding character in the character sequence, if so, authentication is passed, and the data to be processed can be processed; if not, authentication is not passed.

The correspondence between characters and physiological feature information may be stored in a physiological feature information database. For example, in the case where the characters include digits 0 to 9 and the decimal point ".", the physiological feature information database may store a correspondence between digits 0 to 9 and the decimal point "." and respective physiological feature information, an example of which is shown in Table 1, the details of which are omitted.

Figure 4A:
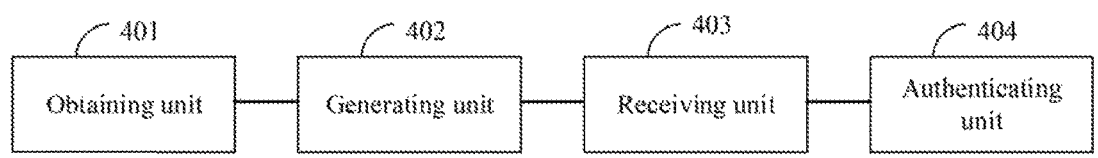
FIG. 4a is a structural diagram of an authentication apparatus according to an embodiment of the present disclosure.
Figure 4B:
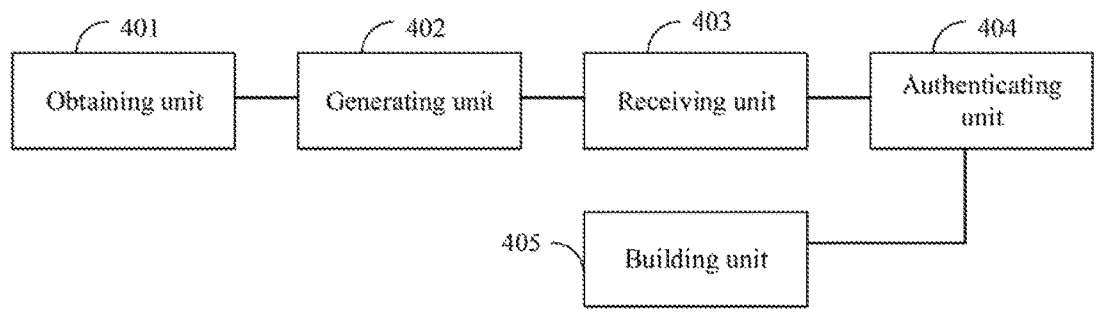
FIG. 4b is a structural diagram of another authentication apparatus according to an embodiment of the present disclosure.

Physiological feature information corresponding to different characters may be the same or different. The correspondence between the characters and physiological feature information may be set according to actual needs, preset by a system or set by the user, that is, the authentication apparatus may further include, as shown in FIG. 4*b*, a building unit 405.

The building unit 405 is configured to build a physiological feature information database, for example, according to one of the following methods.

(1) First Method:

the building unit 405 is configured to obtain a plurality of physiological feature information of the user, receive a correspondence establishing request of the user, where the correspondence establishing request instructs a correspondence between characters and the physiological feature information, establish a correspondence between the plurality of physiological feature information and the characters according to the correspondence establishing request, and store the correspondence in a physiological feature information database.

(2) Second Method:

the building unit 405 is configured to display characters, receive physiological feature information sequentially inputted by a user according to the order of the characters, establish a correspondence between the displayed characters and the physiological feature information inputted by the user for the displayed characters, and store the correspondence in the physiological feature information database.

It should be noted that the characters such as digits 0 to 9 and the decimal point "." may be displayed one after another, or in groups, or even all at the same time, the details of which are omitted.

Optionally, in order to enhance security, prior to the determining whether every physiological feature information in the feature information sequence matches with the corresponding character in the character sequence, a preliminary authentication may be performed on the identity of the user, that is, the obtaining unit 401 may be further configured to obtain a user identifier of the user, and the authenticating unit 404 may be specifically configured to, when it is determined that the obtained user identifier matches with a preset user identifier, determine whether every physiological feature information in the feature information sequence matches with the corresponding character in the character sequence, if so, authentication is passed; if not, authentication is not passed.

When it is determined that the obtained user identifier does not match with the preset user identifier, the authenticating unit 404 denies subsequent operations, for example, rejecting user's data processing requests, authentication requests, etc.

The user identifier may include at least one of: user's e-mail account, username and nickname.

Various verification methods can be used in determining whether the obtained user identifier matches with the preset user identifier, such as password verification, random code verification and any other verification method, the details of which are omitted.

Optionally, in order to avoid authentication failures caused by mistakes of the user and to enhance security, multiple opportunities can be provided for the user to re-input physiological feature information, that is;

the authenticating unit 404 may be further configured to, when it is determined that not every physiological feature information in the feature information sequence matches with the corresponding character in the character sequence, determine whether the number of authentication failures exceeds a predetermined threshold, if not, trigger the receiving unit to receive physiological feature information sequentially inputted by a user, if so, cancel processing of the data.

The predetermined threshold may be set according to actual needs, for example, to be 3 or 5.

In practical implementations, the units above may be implemented as independent entities, or combined as needed into a single entity or a plurality of entities. Specific implementations may be made according to the embodiments above, the details of which are omitted herein.

The authentication apparatus may be a device such as terminal or server, where the terminal may be a cellphone, a tablet computer, a PC, etc.

As described above, in the embodiment, the obtaining unit 401 obtains the data to be processed, the generating unit 402 generates the character sequence based on the data, the receiving unit 403 receives the physiological feature information sequentially inputted by a user according to the order of the characters in the character sequence to obtain the feature information sequence, and the authenticating unit 404 determines whether every physiological feature information in the feature information sequence matches with the corresponding character in the character sequence, if so, authentication is passed; if not, authentication is not passed. In this solution, authentication is not based on a single piece of information, for example, one fingerprint, but a correspondence between a plurality of physiological feature information and multiple characters; and since there are many possible combinations of the plurality of physiological feature information and the multiple characters, there may also be various correspondences therebetween. Thus, even if a certain physiological feature information is stolen, the correspondence cannot be easily cracked, thereby enhancing security, improving authentication performance and ensuring information security.

Embodiment 5

Accordingly, a communications system is also provided according to an embodiment of the present disclosure, which includes an authentication apparatus according to any embodiments of the invention. Specific implementations of the authentication apparatus may be made according to the fourth embodiment, where the authentication apparatus may be a terminal or a server. The communications system will be briefly described below with examples where the authentication apparatus is a terminal and is a server, respectively.

(1) Example where the Authentication Apparatus is a Server.

In addition to the server, the communications system may further include a terminal.

The server is configured to receive the message such as data processing request or authentication request sent by the first terminal, obtain data to be processed based on the message such as data processing request or authentication request, generate the character sequence based on the data, send the character sequence to the first terminal, receive the feature information sequence returned by the first terminal based on the character sequence, determine whether every physiological feature information in the feature information sequence matches with the corresponding character in the character sequence based on a preset physiological feature information database, if so, authentication is passed, and process the data to be processed when needed; if not, authentication is not passed, reject the data processing request or return an authentication failure prompt, etc.

The terminal is configured to send a message such as data processing request or authentication request to the server, display a character sequence upon receipt of the character sequence sent by the server, receive physiological feature information sequentially inputted by a user according to the order of the characters in the character sequence, to obtain a feature information sequence, and send the feature information sequence to the server.

(2) Example where the Authentication Apparatus is a Terminal.

The communications system may at least include the terminal.

The terminal is configured to receive a message such as data processing request or authentication request inputted by a user, obtain data to be processed based on the message such as data processing request or authentication request, generate a character sequence based on the data, display the character sequence, receive physiological feature information sequentially inputted by a user according to the order of characters in the character sequence to obtain a feature information sequence, determine whether every physiological feature information in the feature information sequence matches with the corresponding character in the character sequence based on the physiological feature information database, if so, determine authentication is passed, and perform subsequent data processing, for example, file processing; if not, determine authentication is not passed, reject the data processing request or return a prompt indicating authentication failure, etc.

For specific operations of the devices above, please refer to the foregoing embodiments, the details of which are omitted.

Since the communications system may include the authentication apparatus according to any of the embodiments of the present disclosure, beneficial effects of the authentication apparatus according to the embodiment of the present disclosure can also be achieved by the communications system, where reference can be made to the foregoing embodiments for details.

Embodiment 6

Figure 5:
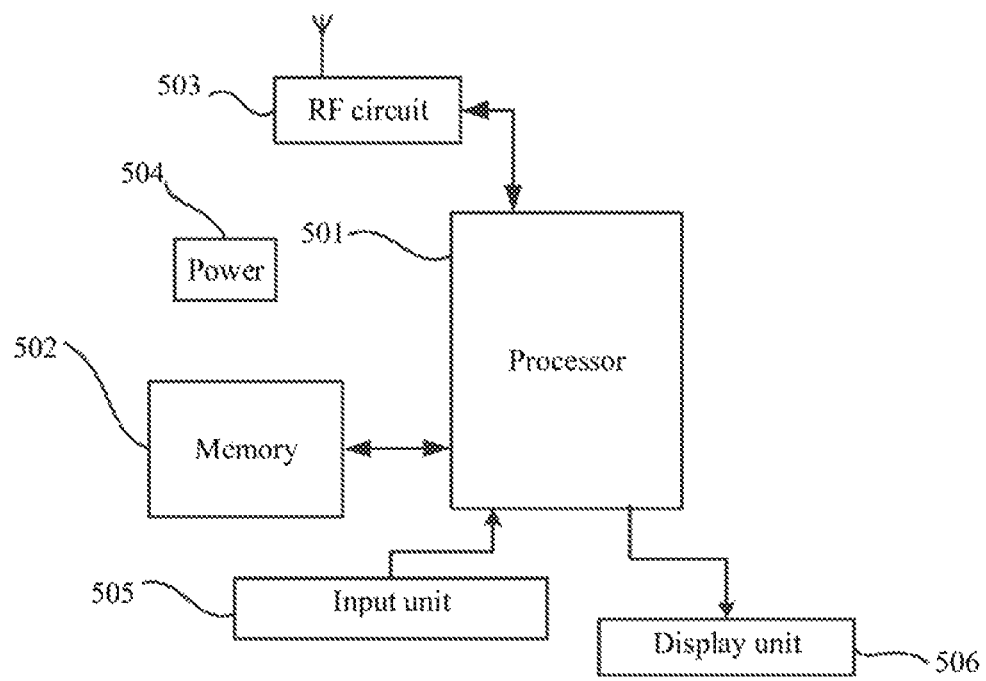
FIG. 5 is a structural diagram of a server according to an embodiment of the present disclosure.

A server is also provided according to an embodiment of the present disclosure. FIG. 5 shows a structural diagram of the server according to the embodiment of the present disclosure.

The server may include a processor 501 including one or more processing cores, a memory 502 including one or more computer readable storage media, a radio frequency (Radio Frequency, RF) circuit 503, a power 504, an input unit 505 and a display unit 506. Those in the art shall understand the structure, shown in FIG. 5, of the server is not constructed as a limit to the server, which may include more or less components than shown in FIG. 5, combinations of some of the components, or different components arrangements.

The processor 501 is the control center of the server, which connects all parts of the server through interfaces and circuits, performs various functions of the server and processes data by running or executing software programs or modules stored in the memory 502 and calling data stored in the memory 502, thereby realizing an overall monitoring on the server. Optionally, the processor 501 may include one or more processing cores. Preferably, the processor 501 may be integrated with an application processor and a modulation/demodulation processor, where the application processor is mainly configured to process operating systems, user interfaces and application programs and the modulation/demodulation processor is mainly configured to process wireless communications. It is understood that the modulation/demodulation processor may not be integrated into the processor 501.

The memory 502 may be configured to store the software programs and modules, and the processor 501 performs various functional applications and data processing by running the software programs and modules stored in the memory 502. The memory 502 may mainly include a program storage zone and a data storage zone, where the operating systems, applications programs required by at least one function (such as an audio playing function and an image playing function) may be stored in the program storage zone and data created in the usage of the server may be stored in the data storage zone. Besides, the memory 502 may include a high-speed random access memory, and further include a nonvolatile memory, such as at least one magnetic disk memory, a flash memory or any other nonvolatile solid memory. Accordingly, the memory 502 may further include a memory controller, to provide an access to the memory 502 for the processor 501.

The RF circuit 503 may be configured to receive and send a signal in the process of receiving and sending information, particularly, receiving downlink information of a base station and transferring the downlink information to the processor 501 including one or more processing cores to process; and, in addition, send uplink-related data to the base station. Generally, the RF circuit 503 includes but is not limited to an antenna, at least one amplifier, a tuner, one or more oscillators, a user identity module (SIM) card, a transceiver, a coupler, an low noise amplifier (LNA, Low Noise Amplifier) and a duplexer. Besides, the RF circuit 503 may communicate with other devices through wireless communications or a network. The wireless communications may adopt any communications standard or protocol, which includes but is not limited to global system of mobile communication (GSM, Global System of Mobile communication), general packet radio service (GPRS, General Packet Radio Service), code division multiple access (CDMA, Code Division Multiple Access), wideband code division multiple access (WCDMA, Wideband Code Division Multiple Access), long term evolution (LTE, Long Term Evolution), e-mail and short messaging service (SMS, Short Messaging Service).

The server further includes a power 504 (for example, a battery) to supply the components with power. Preferably, the power 504 may be logically connected to the processor 501 through a power management system, thereby realizing functions of managing charging and discharging and power consumption management with the power management system. The power may further include any assemblies such as one or more direct current or alternative current powers, a recharging system, a power failure detection circuit, a power converter or inverter and a power status indicator.

The server may further include the input unit 505. The input unit 505 may be configured to receive inputted figures or character information and generate a keyboard, mouse, operating leveler, optical or trackball signal input related to user settings and function control. In a specific embodiment, the input unit 505 may include a touch sensitive surface and other input devices. The touch sensitive surface, also called a touch screen or a touch panel, can collect an operation thereon or nearby (for example, an operation of a user with any applicable object or accessory such as a finger or a touch pen on or near the touch sensitive surface) and drive a corresponding connection device according to a preset procedure. Optionally, the touch sensitive surface may include a touch detecting apparatus and a touch controller. The touch detecting apparatus detects a position of a touch operation by a user and a signal brought in by the touch operation, and sends the signal to the touch controller. The touch controller receives touch information from the touch detecting apparatus, converts the touch information into a coordinate of a touch point, sends the coordinate of the touch point to the processor 501, and receives and executes commands from the processor 501. Besides, the touch sensitive surface may be a resistive, capacitive touch, infrared touch or surface acoustic wave touch sensitive surface. In addition to the touch sensitive surface, the input unit 505 may further include other devices. The other devices may include but are not limited to one or more of a physical keyboard, a functional button (such as a volume control button or a switch button), a trackball, a mouse and an operating lever.

The server may further include the display unit 506. The display unit 506 may be configured to display information inputted by the user or provided for the user, and various graphic user interfaces of the server, where the graphic user interfaces may include images, texts, icons, videos and arbitrary combinations thereof. The display unit 506 may include a display panel, which, optionally, may be configured in the form of liquid crystal display (LCD, Liquid Crystal Display) or organic light-emitting diode (OLED, Organic Light-Emitting Diode). Further, the display panel may be covered by the touch sensitive surface. After detecting a touch operation thereon or nearby, the touch sensitive surface sends the touch operation to the processor 501 to determine a type of the touch event, and then the processor 501 provides a corresponding visual output on the display panel according to the type of the touch event. Although in FIG. 5 the touch sensitive surface and the display panel realize an input and output function as two independent components, the touch sensitive surface and the display panel may be integrated together to realize the input and output function in some embodiments.

Though not shown, the server may further include a camera and a Bluetooth module, which is not described herein redundantly. In the embodiment of the invention, the processor 501 included in the server can load executable files corresponding to one or more application programs into the memory according to the following instructions so that the processor can execute the application programs stored in the memory to realize various functions:

obtaining data to be processed; generating a character sequence based on the data; receiving physiological feature information sequentially inputted by a user, to obtain a feature information sequence; and determining whether every physiological feature information in the feature information sequence matches with the corresponding character in the character sequence. The correspondence between the characters and the pieces of physiological feature information may be stored in a physiological feature information database. If every physiological feature information in the feature information sequence matches with the corresponding character in the character sequence, authentication is passed; if not, authentication is not passed.

Various types of characters may be used according to actual needs, for example, digits such as 0 to 9, English letters, Greek letters or other symbols, the details of which are omitted.

The correspondence between the characters and the pieces of physiological feature information may be stored in a physiological feature information database. Physiological feature information corresponding to different characters may be the same or different. The correspondence between the characters and physiological feature information may be set according to actual needs, preset by a system or set by the user, that is, the processor 501 may further execute an instruction performing the following operation:

building the physiological feature information database, where the physiological feature information database is configured to store a correspondence between characters and physiological feature information.

Specifically, the operation may include, for example, obtaining a plurality of physiological feature information of the user; receiving a correspondence establishing request of the user, where the correspondence establishing request instructs a correspondence between characters and the physiological feature information; establishing a correspondence between the plurality of physiological feature information and characters according to the correspondence establishing request; storing the correspondence in a physiological feature information database.

As another example, the operation may include: displaying characters and receiving physiological feature information sequentially inputted by a user according to the order of the characters; establishing a correspondence between the displayed characters and the physiological feature information inputted by the user for the displayed characters; storing the correspondence in a physiological feature information database.

The physiological feature information may include fingerprint, iris, voiceprint and/or palmprint information.

Optionally, in order to enhance security, prior to the determining whether every physiological feature information in the feature information sequence matches with the corresponding character in the character sequence, a preliminary authentication may be performed on the identity of the user, that is, the processor 501 may further execute instructions for performing the following operations:

obtaining a user identifier of the user and determining whether the obtained user identifier matches with a preset user identifier, determining whether every physiological feature information in the feature information sequence matches with the corresponding character in the character sequence only if the obtained user identifier matches with the preset user identifier.

If it is determined that the obtained user identifier does not match with the preset user identifier, subsequent operations are denied, for example, rejecting user's data processing requests, authentication requests, etc.

The user identifier may include at least one of: user's e-mail account, username and nickname.

In addition, in order to avoid authentication failures caused by mistakes of the user and to enhance security, optionally, multiple opportunities may be provided for the user to re-input physiological feature information, that is, if it is determined that not every physiological feature information in the feature information sequence matches with the corresponding character in the character sequence, the processor 501 may further execute instructions for performing the following operations:

determining whether the number of authentication failures exceeds a predetermined threshold, if not, returning to the step of receiving physiological feature information sequentially inputted by a user; if so, canceling processing of the data.

The predetermined threshold may be set according to actual needs, for example, to be 3 or 5.

Reference can be made to the foregoing embodiments for specific implementations of the operations above, the details of which are omitted.

As described above, the server according to the embodiment obtains the data to be processed, generates the character sequence based on the data, receives the physiological feature information sequentially inputted by a user according to the order of the characters in the character sequence to obtain the feature information sequence, and determines whether every physiological feature information in the feature information sequence matches with the corresponding character in the character sequence. Authentication is passed if every physiological feature information in the feature information sequence matches with the corresponding character in the character sequence; authentication is not passed if not. In the solution, authentication is not based on a single piece of information, for example, one fingerprint, but a correspondence between a plurality of physiological feature information and multiple characters; and since there are many possible combinations of the plurality of physiological feature information and the multiple characters, there may also be various correspondences therebetween. Thus, even if a certain physiological feature information is stolen, the correspondence cannot be easily cracked, thereby enhancing security, improving authentication performance and ensuring information security.

Embodiment 7

Figure 6:
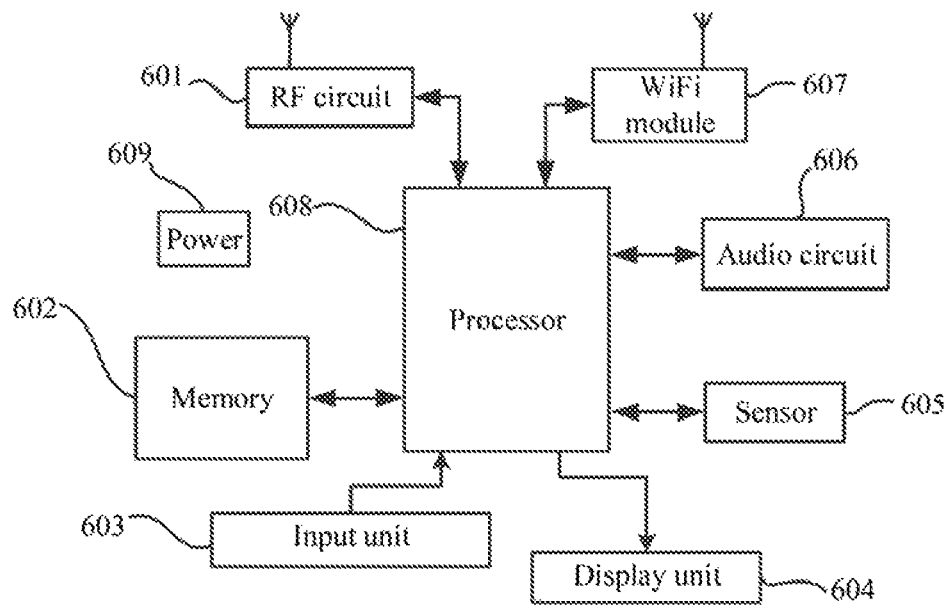
FIG. 6 is a structural diagram of a terminal according to an embodiment of the present disclosure.

Accordingly, a terminal is further provided according to an embodiment of the invention. As shown in FIG. 6, the terminal may include a radio frequency (RF) circuit 601, a memory 602 including one or more computer readable storage media, an input unit 603, a display unit 604, a sensor 605, an audio circuit 606, a wireless fidelity (WiFi) module 607, a processor 608 including one or more processing cores and a power 609. Those in the art shall understand the structure, shown in FIG. 6, of the terminal shall not seen as a limit to the terminal, which may include more or less components than shown in FIG. 6, combinations of some of the components, or different components arrangements.

The RF circuit 601 may be configured to receive and send a signal in the process of receiving and sending information or calling, particularly, receiving downlink information of a base station and transferring the downlink information to the processor 608 including one or more processing cores to process; and, in addition, send uplink-related data to the base station. Generally, the RF circuit 601 includes but is not limited to an antenna, at least one amplifier, a tuner, one or more oscillators, a user identity module (SIM) card, a transceiver, a coupler, an low noise amplifier (LNA) and a duplexer. Besides, the RF circuit 601 may communicate with other devices through wireless communications or a network. The wireless communications may adopt any communications standard or protocol, which includes but is not limited to global system of mobile communication (GSM), general packet radio service (GPRS), code division multiple access (CDMA), wideband code division multiple access (WCDMA), long term evolution (LTE), e-mail and short messaging service (SMS).

The memory 602 may be configured to store software programs and modules, and the processor 608 performs various functional applications and data processing by running the software programs and modules stored in the memory 602. The memory 602 may mainly include a program storage zone and a data storage zone, where operating systems, applications programs required by at least one function (such as an audio playing function and an image playing function) may be stored in the program storage zone and data (such as audio data and phone directories) created in the usage of the terminal may be stored in the data storage zone. Besides, the memory 602 may include a high-speed random access memory, and further include a nonvolatile memory, such as at least one magnetic disk memory, a flash memory or any other nonvolatile solid memory. Accordingly, the memory 602 may further include a memory controller, to provide an access to the memory 602 for the processor 608 and the input unit 603.

The input unit 603 may be configured to receive inputted figures or character information and generate a keyboard, mouse, operating leveler, optical or trackball signal input related to user settings and function control. In a specific embodiment, the input unit 603 may include a touch sensitive surface and some other input device. The touch sensitive surface, also called a touch screen or a touch panel, may collect an operation thereon or nearby (for example, an operation of a user with any applicable object or accessory such as a finger or a touch pen on or near the touch sensitive surface) and drive a corresponding connection device according to a preset procedure. Optionally, the touch sensitive surface may include a touch detecting apparatus and a touch controller. The touch detecting apparatus detects a position of a touch operation by a user and a signal brought in by the touch operation, and sends the signal to the touch controller. The touch controller receives touch information from the touch detecting apparatus, converts the touch information into the coordinates of a touch point, sends the coordinates of the touch point to the processor 608, and receives and executes commands from the processor 608. Besides, the touch sensitive surface may be a resistive, capacitive touch, infrared touch or surface acoustic wave touch sensitive surface. In addition to the touch sensitive surface, the input unit 603 may further include other devices. The other devices may include but are not limited to one or more of a physical keyboard, a functional button (such as a volume control button or a switch button), a trackball, a mouse and an operating lever.

The display unit 604 may be configured to display information inputted by the user or provided for the user, and various graphic user interfaces of the terminal, where the graphic user interfaces may include images, texts, icons, videos and arbitrary combinations thereof. The display unit 604 may include a display panel, which, optionally, may be configured in the form of liquid crystal display (LCD) or organic light-emitting diode (OLED). Further, the display panel may be covered by the touch sensitive surface. After detecting a touch operation thereon or nearby, the touch sensitive surface sends the touch operation to the processor 608 to determine a type of the touch event, and then the processor 608 provides a corresponding visual output on the display panel according to the type of the touch event. Although in FIG. 6 the touch sensitive surface and the display panel realize an input and output function as two independent components, the touch sensitive surface and the display panel may be integrated together to realize the input and output function in some embodiments.

The terminal may further include at least one sensor 605, such as a light sensor, a motion sensor and any other sensor. Specifically, the light sensor may include an environmental light sensor and a proximity sensor. The environmental light sensor can adjust a lightness of the display panel depending on a brightness of environmental light, and the proximity sensor can turn off at least one of the display panel and a backlight of the display panel when the terminal is moved close to an ear. As one kind of the motion sensor, an accelerometer sensor can detect values of accelerations in various directions (generally in three axes), and detect a value and a direction of gravity when being motionless, which can be applied to applications of recognizing a gesture of a cellphone (such as switching between landscape mode and portrait mode, related games and magnetometer calibration) and related functions of vibration recognition (such as a pedometer and a knock). Other sensors may be included in the terminal, such as a gyroscope, a barometer, a hygrometer, a thermometer and an infrared sensor, the details of which are omitted.

The audio circuit 606, a loudspeaker and a microphone can provide an audio interface between a user and the terminal. The audio circuit 606 can transmit an electrical signal converted from received audio data to the loudspeaker, and the loudspeaker converts the electrical signal into an acoustical signal and outputs the acoustical signal. On the other hand, the microphone converts a collected acoustical signal into an electrical signal; the audio circuit receives the electrical signal, converts the electrical signal into audio data and sends the audio data to the processor 608; and after processing the audio data, the processor 608 sends the audio data as processed to another terminal or outputs the audio data to the memory 602 for further processing. The audio circuit 602 may further include a headset jack, to provide communications between an external headset and the terminal.

WiFi is a short distance wireless transmission technology. The terminal facilities the user to receive and send e-mails, browse webpages and access streaming media with the WiFi module 607, providing access to wireless broadband internet for the user. Although the WiFi module 607 is shown in FIG. 6, it is understood the WiFi module 607 is not a necessary part of the terminal and can be omitted without deviating from the scope of the essence of the invention.

The processor 608 is the control center of the terminal, which connects all parts of the cellphone through interfaces and circuits, performs the functions of the terminal and processes data by running or executing the software programs or modules stored in the memory 602 and calling data stored in the memory 602, thereby realizing an overall monitoring on the cellphone. Optionally, the processor 608 may include one or more processing cores. Preferably, the processor 608 may be integrated with an application processor and a modulation/demodulation processor, where the application processor is mainly configured to process the operating systems, user interfaces and applications and the modulation/demodulation processor is mainly configured to process wireless communications. It is understood the modulation/demodulation processor may not be integrated into the processor 608.

The terminal further includes the power 609 (for example, a battery) to supply the components with power. Preferably, the power may be logically connected to the processor 608 through a power management system, thereby realizing functions of managing charging and discharging and power consumption management with the power management system. The power 609 may further include any assemblies such as one or more direct current or alternative current powers, a recharging system, a power failure detection circuit, a power converter or inverter and a power status indicator.

Although not shown, the terminal may further include a camera and a Bluetooth module, the details of which are omitted herein. In the embodiment, the display unit of the terminal is a touch screen monitor. The terminal also includes a memory and one or more programs, where the one or more programs are stored in the memory and instructions, which are included in the one or more programs, for performing the following operations are configured to be executed by the processor 608:

obtaining data to be processed; generating a character sequence based on the data; receiving physiological feature information sequentially inputted by a user, to obtain a feature information sequence; and determining whether every physiological feature information in the feature information sequence matches with the corresponding character in the character sequence. The correspondence between the characters and the pieces of physiological feature information may be stored in a physiological feature information database. If every physiological feature information in the feature information sequence matches with the corresponding character in the character sequence, authentication is passed; if not, authentication is not passed.

Various types of characters may be used according to actual needs, for example, digits such as 0 to 9, English letters, Greek letters or other symbols, the details of which are omitted.

The correspondence between the characters and the pieces of physiological feature information may be stored in a physiological feature information database. Physiological feature information corresponding to different characters may be the same or different. The correspondence between the characters and physiological feature information may be set according to actual needs, preset by a system or set by the user, that is, the processor 608 may further execute an instruction for performing the following operation:

building the physiological feature information database, where the physiological feature information database is configured to store a correspondence between characters and physiological feature information.

Specifically, the operation may include, for example, obtaining a plurality of physiological feature information of the user; receiving a correspondence establishing request of the user, where the correspondence establishing request instructs a correspondence between characters and the physiological feature information; establishing a correspondence between the plurality of physiological feature information and characters according to the correspondence establishing request; storing the correspondence in a physiological feature information database.

As another example, the operation may include: displaying characters and receiving physiological feature information sequentially inputted by a user according to the order of the characters; establishing a correspondence between the displayed characters and the physiological feature information inputted by the user for the displayed characters; storing the correspondence in a physiological feature information database.

The physiological feature information may include fingerprint, iris, voiceprint and/or palmprint information.

Optionally, in order to enhance security, prior to the determining whether every physiological feature information in the feature information sequence matches with the corresponding character in the character sequence, a preliminary authentication may be performed on the identity of the user, that is, the processor 608 may further execute instructions for performing the following operations:

obtaining a user identifier of the user and determining whether the obtained user identifier matches with a preset user identifier, determining whether every physiological feature information in the feature information sequence matches with the corresponding character in the character sequence only if the obtained user identifier matches with the preset user identifier.

If it is determined that the obtained user identifier does not match with the preset user identifier, subsequent operations are denied, for example, rejecting user's data processing requests, authentication requests, etc.

The user identifier may include at least one of: user's e-mail account, username and nickname.

In addition, in order to avoid authentication failures caused by mistakes of the user and to enhance security, optionally, multiple opportunities may be provided for the user to re-input physiological feature information, that is, if it is determined that not every physiological feature information in the feature information sequence matches with the corresponding character in the character sequence, the processor 608 may further execute instructions for performing the following operations:

determining whether the number of authentication failures exceeds a predetermined threshold, if not, returning to the step of receiving physiological feature information sequentially inputted by a user; if so, canceling processing of the data.

The predetermined threshold may be set according to actual needs, for example, to be 3 or 5.

Reference can be made to the foregoing embodiments for specific implementations of the operations above, the details of which are omitted.

As described above, the terminal according to the embodiment may obtain the data to be processed, generate the character sequence based on the data, receive the physiological feature information sequentially inputted by a user according to the order of the characters in the character sequence to obtain the feature information sequence, and determine whether every physiological feature information in the feature information sequence matches with the corresponding character in the character sequence. Authentication is passed if every physiological feature information in the feature information sequence matches with the corresponding character in the character sequence; authentication is not passed if not. In the solution, authentication is not based on a single piece of information, for example, one fingerprint, but a correspondence between a plurality of physiological feature information and multiple characters; and since there are many possible combinations of the plurality of physiological feature information and the multiple characters, there may also be various correspondences therebetween. Thus, even if a certain physiological feature information is stolen, the correspondence cannot be easily cracked, thereby enhancing security, improving authentication performance and ensuring information security.

Those in the art shall understand all or some of the steps according to the embodiments above can be performed through related hardware under the instruction of a program. The program may be stored in a computer readable storage medium, which may be a read-only memory (ROM, Read Only Memory), a random access memory (RAM, Random Access Memory), a magnetic disk or an optical disc.

An authentication method and an apparatus thereof according to the embodiments of the present disclosure are described in detail above. Specific examples are given in the illustration of the principle and implementation of the disclosure, and the description of the embodiments herein are for the mere purpose of a better understanding the method and idea of the disclosure. In addition, modifications may be made by those skilled in the art on the specific implementations and application scopes based on the idea of the invention. In conclusion, the specification should not be interpreted as limiting the disclosure.

What is claimed is:

1. An authentication method, comprising:
   obtaining, by a processor, data received from a user to be processed;
   generating, by the processor, a character sequence based on the received data, wherein each character in the character sequence corresponds to a specific physiological feature information of the user, and a location of each character in the generated character sequence corresponds to a specific order in the generated character sequence on how the specific physiological feature information of the user are to be received as prompted sequential inputs;
   receiving by the processor, the specific physiological feature information sequentially inputted by the user as prompted response to the generated character sequence from the priorly received data; and
   determining, by the processor, whether every piece of the specific physiological feature information according to the input sequence matches with each and every of the corresponding characters according to the specific order in the generated character sequence, such that unauthorized authentication due to misuse of biometric data is prevented.

2. The method according to claim 1, wherein the determining, by the processor, whether every piece of the specific physiological feature information according to the input sequence matches with each and every of the corresponding characters according to the specific order in the generated character sequence, comprises:
   according to the order of appearance of the specific physiological feature information in the input sequence and the order of appearance of each and every of the corresponding characters according to the specific order in the generated character sequence, determining whether every pair of the specific physiological feature information and character matches in a same order.

3. The method according to claim 1, further comprising:
   obtaining a user identifier of the user; and
   determining whether the obtained user identifier matches with a preset user identifier.

4. The method according to claim 1, further comprising:
   building a physiological feature information database, wherein the physiological feature information database is configured to store a correspondence between a plurality of characters and a plurality of pieces of physiological feature information, and the plurality of characters comprise the characters in the generated character sequence, and the plurality of pieces of physiological feature information comprise the specific physiological feature information in the obtained feature information sequence,
   wherein the determining, by the processor, whether every piece of the specific physiological feature information according to the input sequence matches with the corresponding character in the generated character sequence comprises:
   searching the physiological feature information database, and determining whether every piece of the specific physiological feature information in the input sequence matches with the corresponding character in the generated character sequence according to the correspondence.

5. The method according to claim 4, wherein the building a physiological feature information database comprises:
   obtaining the plurality of pieces of physiological feature information from the user;
   receiving a correspondence establishing request of the user, wherein the correspondence establishing request instructs the correspondence between the plurality of characters and the plurality of pieces of physiological feature information;
   establishing the correspondence according to the correspondence establishing request; and
   storing the correspondence in the physiological feature information database.

6. The method according to claim 4, wherein the building a physiological feature information database comprises:
   displaying the plurality of characters;
   receiving the plurality of pieces of physiological feature information sequentially inputted by a user according to the order of the plurality of characters;
   establishing a correspondence between the plurality of characters and the plurality of pieces of physiological feature information; and
   storing the correspondence in the physiological feature information database.

7. The method according to claim 1, wherein if it is determined that not every piece of the specific physiological feature information in the input sequence matches with the corresponding character in the generated character sequence, it is determined that authentication fails, and the method further comprises:
   determining whether a number of authentication failures exceeds a predetermined threshold, if not, receiving, again, physiological feature information sequentially inputted by the user.

8. The method according to claim 1, wherein the characters in the generated character sequence comprise a digit and a decimal point.

9. The method according to claim 1, wherein the receiving, by the processor, the specific physiological feature information sequentially inputted by a user, to obtain a feature information sequence comprises:
   displaying the generated character sequence; and
   receiving the specific physiological feature information sequentially inputted by the user according to the order of the characters in the generated character sequence, to obtain the feature information sequence.

10. The method according to claim 1, wherein,
   the specific physiological feature information comprises at least one of: fingerprint, iris, voiceprint and palmprint.

11. An authentication apparatus, comprising:
a memory; and
one or more processors,
wherein program instructions are stored in the memory, and the apparatus is configured to perform the following operations when the program instructions are executed by the one or processors:
obtaining data received from a user to be processed;
generating a character sequence based on the received data, wherein each character in the character sequence corresponds to a specific physiological feature information of the user, and a location of each character in the generated character sequence corresponds to a specific order in the generated character sequence on how the specific physiological feature information of the user are to be received as prompted sequential inputs;
receiving the specific physiological feature information sequentially inputted by the user as prompted response to the generated character sequence from the priorly received data; and
determining whether every piece of the specific physiological feature information according to the input sequence matches with each and every of the corresponding characters according to the specific order in the generated character sequence, such that unauthorized authentication due to misuse of biometric data is prevented.

12. The authentication apparatus according to claim 11, wherein the determining whether every piece of the specific physiological feature information according to the input sequence matches with each and every of the corresponding characters according to the specific order in the generated character sequence, comprises:
according to the order of appearance of the specific physiological feature information in the input sequence and the order of appearance of each and every of the corresponding characters according to the specific order in the generated character sequence, determining whether every pair of the specific physiological feature information and character matches in a same order.

13. The authentication apparatus according to claim 11, wherein the operations further comprise:
obtaining a user identifier of the user; and
determining whether the obtained user identifier matches with a preset user identifier.

14. The authentication apparatus according to claim 11, wherein the operations further comprise:
building a physiological feature information database, wherein the physiological feature information database is configured to store a correspondence between a plurality of characters and a plurality of pieces of physiological feature information, and the plurality of characters comprise the characters in the generated character sequence, and the plurality of pieces of physiological feature information comprise the specific physiological feature information in the obtained feature information sequence,
wherein the determining, by the processor, whether every piece of the specific physiological feature information according to the input sequence matches with the corresponding character in the generated character sequence comprises:
searching the physiological feature information database, and determining whether every piece of the specific physiological feature information in the input sequence matches with the corresponding character in the generated character sequence according to the correspondence.

15. The authentication apparatus according to claim 14, wherein the building a physiological feature information database comprises:
obtaining the plurality of pieces of physiological feature information from the user;
receiving a correspondence establishing request of the user, wherein the correspondence establishing request instructs the correspondence between the plurality of characters and the plurality of pieces of physiological feature information;
establishing the correspondence according to the correspondence establishing request; and
storing the correspondence in the physiological feature information database.

16. The authentication apparatus according to claim 14, wherein the building a physiological feature information database comprises:
displaying the plurality of characters;
receiving the plurality of pieces of physiological feature information sequentially inputted by a user according to the order of the plurality of characters;
establishing a correspondence between the plurality of characters and the plurality of pieces of physiological feature information; and
storing the correspondence in the physiological feature information database.

17. The authentication apparatus according to claim 11, wherein if it is determined that not every piece of the specific physiological feature information in the input sequence matches with the corresponding character in the generated character sequence, it is determined that authentication fails, and the operations further comprise:
determining whether a number of authentication failures exceeds a predetermined threshold, if not, receiving, again, physiological feature information sequentially inputted by the user.

18. The authentication apparatus according to claim 11, wherein the characters in the generated character sequence comprise a digit and a decimal point.

19. The authentication apparatus according to claim 11, wherein the receiving of the specific physiological feature information sequentially inputted by a user, to obtain a feature information sequence comprises:
displaying the generated character sequence; and
receiving the specific physiological feature information sequentially inputted by the user according to the order of the characters in the generated character sequence, to obtain the feature information sequence.

20. A non-transitory computer-readable storage medium, the storage medium being stored with program instructions, wherein the program instructions, when executed by a processor, configure the processor to perform the following operations:
obtaining data received from a user to be processed;
generating a character sequence based on the received data, wherein each character in the character sequence corresponds to a specific physiological feature information of the user, and a location of each character in the generated character sequence corresponds to a specific order in the generated character sequence on how the specific physiological feature information of the user are to be received as prompted sequential inputs;

receiving the specific physiological feature information sequentially inputted by the user as prompted response to the generated character sequence from the priorly received data; and determining whether every piece of the specific physiological feature information according to the input sequence matches with each and every of the corresponding characters according to the specific order in the generated character sequence, such that unauthorized authentication due to misuse of biometric data is prevented.

\* \* \* \* \*